US012542089B2

(12) United States Patent
Kang

(10) Patent No.: US 12,542,089 B2
(45) Date of Patent: Feb. 3, 2026

(54) IMAGE DISPLAY APPARATUS

(71) Applicant: LG ELECTRONICS INC., Seoul (KR)

(72) Inventor: Byeongkook Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/658,766

(22) Filed: May 8, 2024

(65) Prior Publication Data

US 2025/0061837 A1 Feb. 20, 2025

(30) Foreign Application Priority Data

Aug. 18, 2023 (KR) ........................ 10-2023-0108349

(51) Int. Cl.
*G09G 3/32* (2016.01)
*G09G 3/20* (2006.01)
*G09G 3/3208* (2016.01)

(52) U.S. Cl.
CPC ............. *G09G 3/2096* (2013.01); *G09G 3/32* (2013.01); *G09G 3/3208* (2013.01); *G09G 2370/04* (2013.01); *G09G 2370/08* (2013.01); *G09G 2370/20* (2013.01); *G09G 2370/22* (2013.01)

(58) Field of Classification Search
CPC ...... G09G 3/2096; G09G 3/32; G09G 3/3208; G09G 2370/04; G09G 2370/08; G09G 2370/20; G09G 2370/22
See application file for complete search history.

(56) References Cited

U.S. PATENT DOCUMENTS 11,189,220 B1 * 11/2021 Zheng .................. G09G 3/3426
2015/0279285 A1 * 10/2015 Sako ...................... G09G 5/006
345/694
2021/0064326 A1 * 3/2021 Hagiwara ................ H04R 5/04
2022/0223097 A1 * 7/2022 Lee ........................ G09G 5/391

FOREIGN PATENT DOCUMENTS

KR 1020150128133 11/2015
KR 1020210142393 11/2021
KR 1020220088419 6/2022
KR 1020220088420 6/2022

OTHER PUBLICATIONS

Korean Intellectual Property Office Application No. 10-2023-0108349, Notice of Allowance dated Jan. 30, 2025, 2 pages.

* cited by examiner

*Primary Examiner* — Towfiq Elahi
(74) *Attorney, Agent, or Firm* — LEE, HONG, DEGERMAN, KANG & WAIMEY

(57) ABSTRACT

The present disclosure relates to an image display apparatus. An image display apparatus according to one embodiment of the present disclosure comprises a memory, a display, an audio output device, and a signal processing device configured to output an image signal to the display, wherein at least one of a plurality of output ports or a plurality of input ports of the signal processing device operates based on a first communication mode or a second communication mode, and the signal processing device is configured to store a communication mode of an output port or an input port in operation to the memory while operating in the first communication mode or second communication mode. Accordingly, a plurality of data communications may be stably performed between modules.

18 Claims, 15 Drawing Sheets

IMAGE DISPLAY APPARATUS

CROSS-REFERENCE TO RELATED APPLICATION(S)

Pursuant to 35 U.S.C. § 119, this application claims the benefit of earlier filing date and right of priority to Korean Application No(s). 10-2023-0108349, filed on Aug. 18, 2023, the contents of which are all incorporated by reference herein in its entirety

BACKGROUND

1. Field

The present disclosure relates to an image display apparatus, and more particularly, to an image display apparatus capable of stably performing multiple data communication between modules.

2. Description of the Related Art

An image display apparatus is an apparatus that displays images.

Meanwhile, an image display apparatus includes various modules and displays an image or outputs a sound by performing data communication between modules.

Meanwhile, Korea registered patent No. 10-0656522 discloses a control system and method for service between different modules using general-purpose input/output ports.

According to the prior art, the disclosed control system and method monitors transmitted booting state information and power state information to control the output state of a power lamp.

However, according to the prior art, using general-purpose input/output (GPIO) ports for data communication between modules makes it difficult to perform various communication modes, thereby lowering the efficiency of data communication.

SUMMARY

An object of the present disclosure is to provide an image display apparatus capable of stably performing a plurality of data communications between modules.

Meanwhile, another object of the present disclosure is to provide an image display apparatus capable of reducing communication defects during data communication between modules.

Meanwhile, yet another object of the present disclosure is to provide an image display apparatus capable of stably transmitting an image signal output from a signal processing device to a timing controller.

To achieve the objects above, an image display apparatus according to one embodiment of the present disclosure comprises a memory, a display, an audio output device, and a signal processing device configured to output an image signal to the display, wherein at least one of a plurality of output ports or a plurality of input ports of the signal processing device operates based on a first communication mode or a second communication mode, and the signal processing device is configured to store a communication mode of an output port or an input port in operation to the memory while operating in the first communication mode or second communication mode.

Meanwhile, in case in which a request of the first communication mode is received after power is on, the signal processing device may be configured to start the first communication mode and store the first communication mode the memory.

Meanwhile, after storing the first communication mode to the memory, in case in which a request of the second communication mode is received while operating in the first communication mode, the signal processing device may be configured to start the second communication mode and store the second communication mode to the memory.

Meanwhile, after storing the second communication mode to the memory, in case in which a request of the first communication mode is received while operating in the second communication mode, the signal processing device may be configured to start the first communication mode and store the first communication mode the memory.

Meanwhile, in case in which a request of the second communication mode is received, the signal processing device may be configured to start the second communication mode and store the second communication mode to the memory.

Meanwhile, after the second communication mode is stored, in case in which a request of the first communication mode is received while operating in the second communication mode, the signal processing device may be configured to start the first communication mode and store the first communication mode the memory.

Meanwhile, after power is on, the signal processing device may control to operate in the first communication mode based on the request of the first communication mode.

Meanwhile, is case in which power is on, and a predetermined period is passed, the signal processing device may control to operate in the first communication mode.

Meanwhile, after power is on, the signal processing device may control to operate in the second communication mode based on the request of the second communication mode.

Meanwhile, while operating in the first communication mode or second communication mode, the signal processing device may be configured to store the communication mode in operation to the memory.

Meanwhile, based on the communication mode in operation stored to the memory, the signal processing device may control to maintain the communication mode in operation until a request of the first communication mode or second communication mode is received.

Meanwhile, after power is on, the signal processing device may control to operate based on a final communication mode stored to the memory until a request of the first communication mode or second communication mode is received.

Meanwhile, the first communication mode may be General Purpose Input Output (GPIO) mode, and the second communication mode may be Inter Integrated Circuit (I2C) mode.

Meanwhile, while operating in the second communication mode, the signal processing device may control the high-level section of a data signal to be longer than the high-level section of a clock signal and the high-level section of the clock signal to be included in the high-level section of the data signal.

Meanwhile, a first output port among a plurality of output ports of the signal processing device may transmit data or a control signal to the memory based on the first communication mode or second communication mode, and the signal processing device may be configured to store the communication mode of the first output port in operation to the memory while operating in the first communication mode or second communication mode.

Meanwhile, an image processing apparatus according to one embodiment of the present disclosure may further comprise an audio output device, a second output port among a plurality of output ports of the signal processing device may transmit an audio signal to the audio output device based on the first communication mode or second communication mode, and the signal processing device may be configured to store the communication mode of the second output port in operation to the memory while operating in the first or second communication mode.

An image display apparatus according to one embodiment of the present disclosure may further comprise a power supply, a third output port among a plurality of output ports of the signal processing device may transmit a control signal to the power supply based on the first communication mode or second communication mode, and the signal processing device may be configured to store the communication mode of the third output port in operation to the memory while operating in the first or second communication mode.

Meanwhile, a fourth output port among a plurality of output ports of the signal processing device may transmit an image signal to a timing controller within the display based on the first communication mode or second communication mode, and the signal processing device may be configured to store the communication mode of the fourth output port in operation to the memory while operating in the first or second communication mode.

An image display apparatus according to one embodiment of the present disclosure may further comprise a tuner to receive a broadcast signal, an input port of the signal processing device receives a broadcast signal from the tuner based on the first communication mode or second communication mode, and the signal processing device may be configured to store the communication mode of the input port in operation to the memory while operating in the first or second communication mode.

Meanwhile, the memory may store a communication mode in operation between the signal processing device and the display, a communication mode in operation between the signal processing device and the audio output device, or a communication mode in operation between the signal processing device and the memory.

An image display apparatus according to another embodiment of the present disclosure may comprise a memory, a display including a timing controller and a panel, and a signal processing device configured to output an image signal to the display, wherein a first output port among a plurality of output ports of the signal processing device transmits an image signal to the timing controller based on the first communication mode or second communication mode, and the signal processing device is configured to store a communication mode in operation to the memory while operating in the first communication mode or second communication mode.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Hereinafter, the present disclosure will be described in detail with reference to the accompanying drawings.

Regarding constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
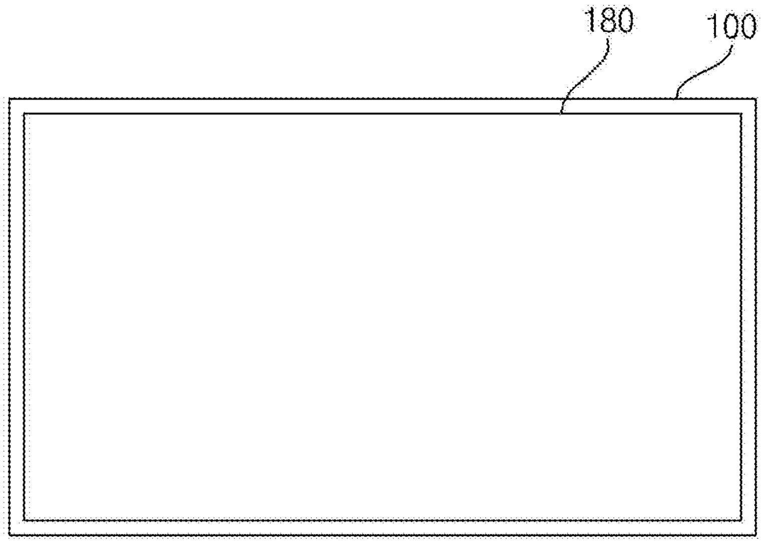
FIG. 1 is a diagram showing an image display apparatus according to one embodiment of the present disclosure.

FIG. 1 is a diagram showing an image display apparatus according to an embodiment of the present disclosure.

Referring to the figure, an image display apparatus 100 may include a display 180.

Meanwhile, the display 180 may be implemented using one of the various panels. For example, the display 180 may be implemented using one of the self-luminous panels, such as an organic light-emitting panel (OLED panel), an inorganic light-emitting panel (LED panel), or a micro-LED panel.

Meanwhile, the image display device 100 performs data communication between various internal modules.

The image display apparatus 100 according to one embodiment of the present disclosure performs a plurality of data communication modes when performing data communication between internal modules. Accordingly, data transmission efficiency may be improved, and power consumption may be reduced.

To this end, an image display apparatus 100 according to one embodiment of the present disclosure comprises a memory (140 of FIG. 2), a display 180, an audio output device (185 of FIG. 2), and a signal processing device (170 of FIG. 2) outputting an image signal to the display 180, wherein at least one of a plurality of output ports or a plurality of input ports of the signal processing device 170 operates based on a first communication mode or a second communication mode, and the signal processing device 170 is configured to store a communication mode of an output port or an input port PNi in operation to the memory 140 while operating in the first communication mode or second communication mode.

Accordingly, a plurality of data communications between modules may be performed stably. Furthermore, communication defects may be reduced when data communication is performed between modules within the image display apparatus 100.

Meanwhile, the image display apparatus 100 of FIG. 1 may be a TV, a monitor, a tablet PC, a mobile terminal, or an in-vehicle display device.

Figure 2:
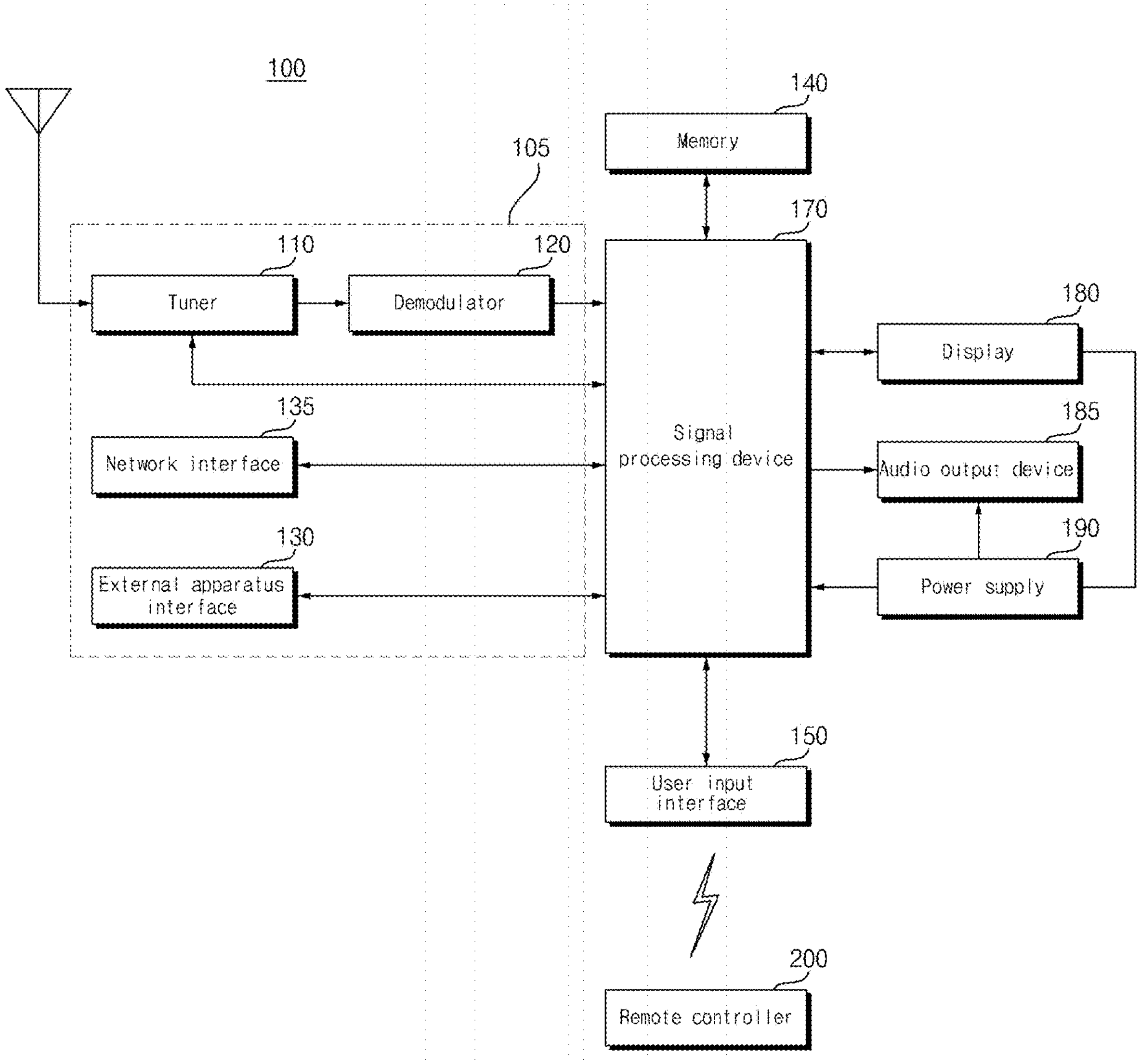
FIG. 2 is an example of an internal block diagram of the image display apparatus.

FIG. 2 is an example of an internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor device (not shown), a signal processing device 170, a display 180, and an audio output device 185.

The image receiver 105 may include a tuner 110, a demodulator 120, a network interface 135, and an external apparatus interface 130.

Meanwhile, unlike the figure, the image receiver 105 may include only the tuner 110, the demodulator 120, and the external apparatus interface 130. That is, the network interface 135 may not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

Meanwhile, the tuner 110 may include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processing device 170. The signal processing device 170 performs demultiplexing, image/audio signal processing, and the like, and then outputs an image to the display 180 and outputs audio to the audio output device 185.

The external apparatus interface 130 may transmit or receive data to or from a connected external apparatus (not shown), e.g., a set-top box 50. To this end, the external apparatus interface 130 may include an A/V input and output device (not shown).

The external apparatus interface 130 may be connected in wired or wirelessly to an external apparatus, such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless transceiver (not shown) may perform short-range wireless communication with other electronic apparatus.

Through the wireless transceiver (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless transceiver (not shown).

The memory 140 may store a program for each signal processing and control in the signal processing device 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function, such as a channel map.

Although FIG. 2 illustrates that the memory is provided separately from the signal processing device 170, the scope of the present disclosure is not limited thereto. The memory 140 may be included in the signal processing device 170.

The user input interface 150 transmits a signal input by the user to the signal processing device 170 or transmits a signal from the signal processing device 170 to the user.

For example, it may transmit/receive a user input signal, such as power on/off, channel selection, screen setting, etc., from a remote controller 200, may transfer a user input signal input from a local key (not shown), such as a power key, a channel key, a volume key, a set value, etc., to the signal processing device 170, may transfer a user input signal input from a sensor device (not shown) that senses a user's gesture to the signal processing device 170, or may transmit a signal from the signal processing device 170 to the sensor device (not shown).

The signal processing device 170 may demultiplex the input stream through the tuner 110, the demodulator 120, the network interface 135, or the external apparatus interface 130, or process the demultiplexed signals to generate and output a signal for image or audio output.

For example, the signal processing device 170 receives a broadcast signal received by the image receiver 105 or an HDMI signal and perform signal processing based on the received broadcast signal or the HDMI signal to thereby output a processed image signal.

The image signal processed by the signal processing device 170 is input to the display 180, and may be displayed as an image corresponding to the image signal. In addition, the image signal processed by the signal processing device 170 may be input to the external output apparatus through the external apparatus interface 130.

The audio signal processed by the signal processing device 170 may be output to the audio output device 185 as an audio signal. In addition, audio signal processed by the signal processing device 170 may be input to the external output apparatus through the external apparatus interface 130.

Although not shown in FIG. 2, the signal processing device 170 may include a demultiplexer, an image processor, and the like. That is, the signal processing device 170 may perform a variety of signal processing and thus it may be implemented in the form of a system on chip (SOC). This will be described later with reference to FIG. 3.

In addition, the signal processing device 170 may control the overall operation of the image display apparatus 100. For example, the signal processing device 170 may control the tuner 110 to control the tuning of the RF broadcast corresponding to the channel selected by the user or the previously stored channel.

In addition, the signal processing device 170 may control the image display apparatus 100 according to a user command input through the user input interface 150 or an internal program.

Meanwhile, the signal processing device 170 may control the display 180 to display an image. At this time, the image displayed on the display 180 may be a still image or a moving image, and may be a 2D image or a 3D image.

Meanwhile, the signal processing device 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processing device 170 may recognize the position of the user based on the image photographed by a photographing device (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the signal processing device 170, an image signal, a data signal, a control signal, and the like received from the external apparatus interface 130.

Meanwhile, the display 180 may be configured as a touch screen and used as an input device in addition to an output device.

The audio output device 185 receives a signal processed by the signal processing device 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a signal processing device 170 which may be implemented in the form of a system on chip (SOC), a display 180 for displaying an image, and an audio output device 185 for outputting an audio.

Specifically, the power supply 190 may include a converter converting AC power to DC voltage and a DC/DC converter converting the level of the DC voltage.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150 and display it on the remote controller 200 or output it as an audio.

Meanwhile, the image display apparatus 100 may be a fixed or mobile digital broadcast receiver capable of receiving digital broadcast.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be split into two or more components. The function performed in each block is described for the purpose of illustrating embodiments of the present disclosure, and specific operation and apparatus do not limit the scope of the present disclosure.

Figure 3:
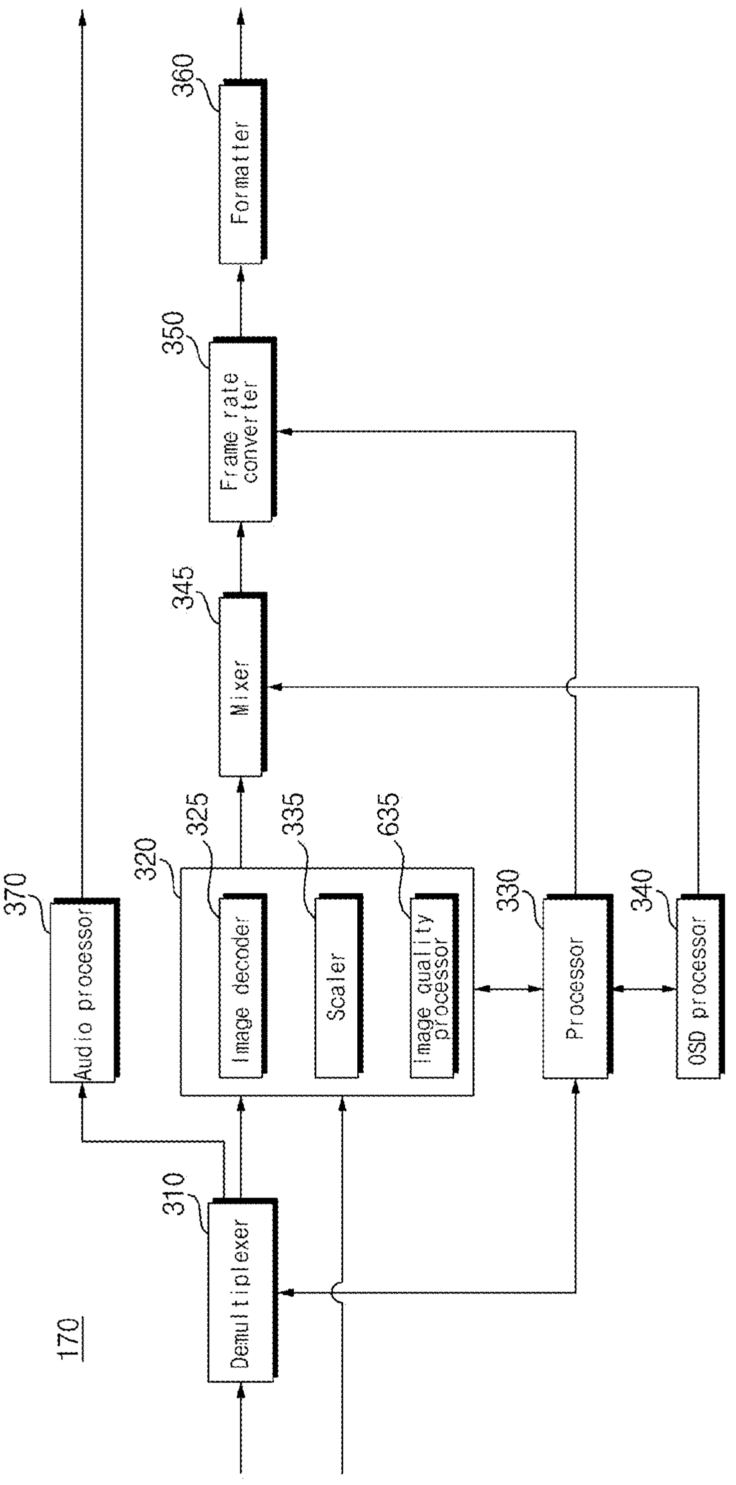
FIG. 3 is an example of an internal block diagram of a signal processing device of FIG. 2.

FIG. 3 is an example of an internal block diagram of the signal processing device in FIG. 2.

Referring to the figure, the signal processing device 170 according to an embodiment of the present disclosure may include a demultiplexer 310, an image processor 320, a processor 330, and an audio processor 370. In addition, the signal processing device 170 may further include and a data processor (not shown).

The demultiplexer 310 demultiplexes the input stream. For example, when an MPEG-2 TS is input, it may be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal may be output from the display 180.

The image decoder 325 may include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 635 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data, such as a user interface screen of the image display apparatus 100, various menu screens, a widget, and an icon. In addition, the generated OSD signal may include a 2D object or a 3D object.

In addition, the OSD processor 340 may generate a pointer that may be displayed on the display, based on a pointing signal input from the remote controller 200. In particular, such a pointer may be generated by a pointing signal processing device, and the OSD processor 340 may include such a pointing signal processing device (not shown). Obviously, the pointing signal processing device (not shown) may be provided separately from the OSD processor 340.

The frame rate converter (FRC) 350 may convert a frame rate of an input image. Meanwhile, the frame rate converter 350 may output the input image without converting the frame rate.

Meanwhile, the formatter 360 may change a format of an input image signal into a format suitable for displaying the image signal on a display and output the image signal in the changed format.

In particular, the formatter 360 may change a format of an image signal to correspond to a display panel.

The processor 330 may control overall operations of the image display apparatus 100 or the signal processing device 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processing device 170.

Meanwhile, the audio processor 370 in the signal processing device 170 may perform the audio processing of the demultiplexed audio signal. To this end, the audio processor 370 may include various decoders.

In addition, the audio processor 370 in the signal processing device 170 may process a base, a treble, a volume control, and the like.

The data processor (not shown) in the signal processing device 170 may perform data processing of the demultiplexed data signal. For example, when the demultiplexed data signal is a coded data signal, it may be decoded. The encoded data signal may be electronic program guide information including broadcast information, such as a start time and an end time of a broadcast program broadcasted on each channel.

Meanwhile, a block diagram of the signal processing device 170 shown in FIG. 3 is a block diagram for an embodiment of the present disclosure. Each component of the block diagram may be integrated, added, or omitted according to a specification of the signal processing device 170 actually implemented.

In particular, the frame rate converter 350 and the formatter 360 may be provided separately in addition to the image processor 320.

Figure 4A:
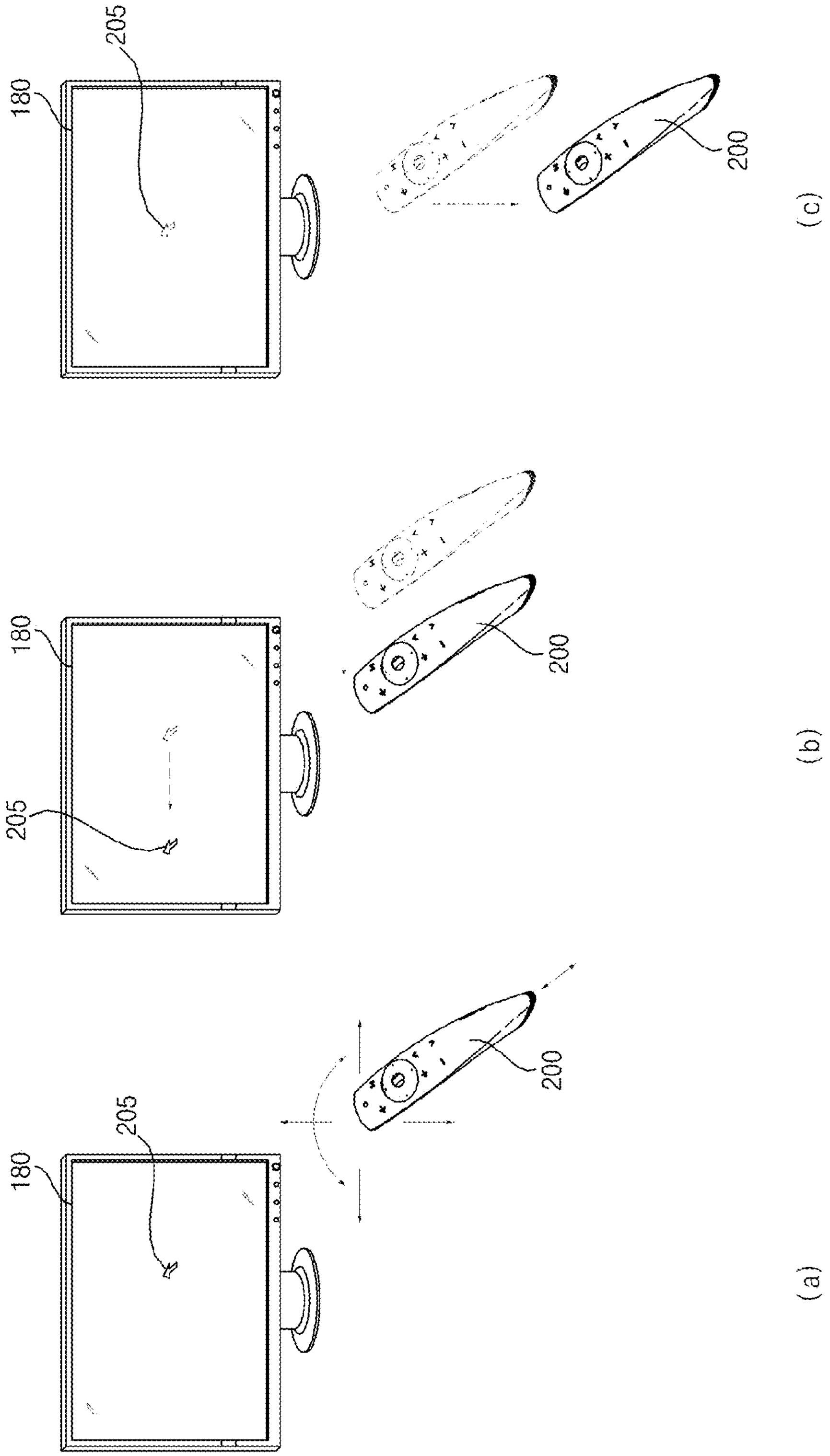
FIG. 4A is a diagram showing a method of controlling a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the figure.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180, while pressing a specific button of the remote controller 200. Thus, a selection area within the display 180 corresponding to the pointer 205 may be zoomed in so that it may be displayed to be enlarged. Meanwhile, when the user moves the remote controller 200 close to the display 180, the selection area within the display 180 corresponding to the pointer 205 may be zoomed out so that it may be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
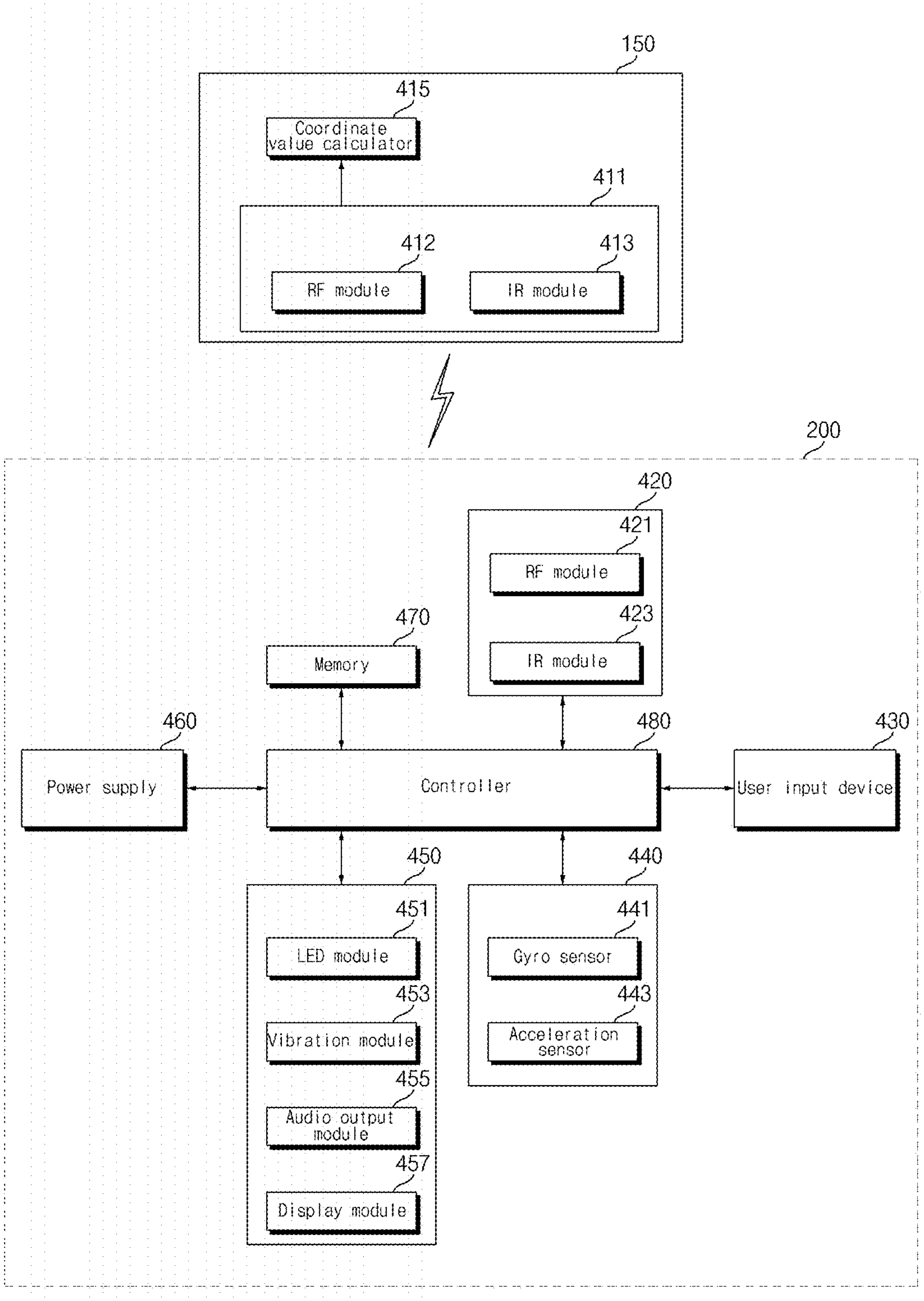
FIG. 4B is an internal block diagram of the remote controller of FIG. 2.

FIG. 4B is an internal block diagram of the remote controller of FIG. 2.

Referring to the figure, the remote controller 200 includes a wireless transceiver 425, a user input device 435, a sensor device 440, an output device 450, a power supply 460, a memory 470, and a controller 480.

The wireless transceiver 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to an IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 435 may be implemented by a keypad, a button, a touch pad, a touch screen, or the like. The user may operate the user input device 435 to input a command related to the image display apparatus 100 to the remote controller 200. When the user input device 435 includes a hard key button, the user may input a command related to the image display apparatus 100 to the remote controller 200 through a push operation of the hard key button. When the user input device 435 includes a touch screen, the user may touch a soft key of the touch screen to input the command related to the image display apparatus 100 to the remote controller 200. In addition, the user input device 435 may include various types of input means, such as a scroll key, a jog key, etc., which may be operated by the user, and the present disclosure does not limit the scope of the present disclosure.

The sensor device 440 may include a gyro sensor 441 or an acceleration sensor 443. The gyro sensor 441 may sense information regarding the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 435 or a signal transmitted from the image display apparatus 100. Through the output device 450, the user may recognize whether the user input device 435 is operated or whether the image display apparatus 100 is controlled.

For example, the output device 450 may include an LED module 451 that is turned on when the user input device 435 is operated or a signal is transmitted/received to/from the image display apparatus 100 through the wireless transceiver 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information regarding a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 435 or a signal corresponding to the motion of the remote controller 200 sensed by the sensor device 440 to the image display apparatus 100 through the wireless transceiver 425.

The user input interface 150 of the image display apparatus 100 includes a wireless transceiver 151 that may wirelessly transmit and receive a signal to and from the remote controller 200 and a coordinate value calculator 415 that may calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to an IR communication standard.

The coordinate value calculator 415 may correct a hand shake or an error from a signal corresponding to the operation of the remote controller 200 received through the wireless transceiver 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of handshake or error.

For another example, unlike the figure, the coordinate value calculator 415 may be provided in the signal processing device 170, not in the user input interface 150.

Figure 5:
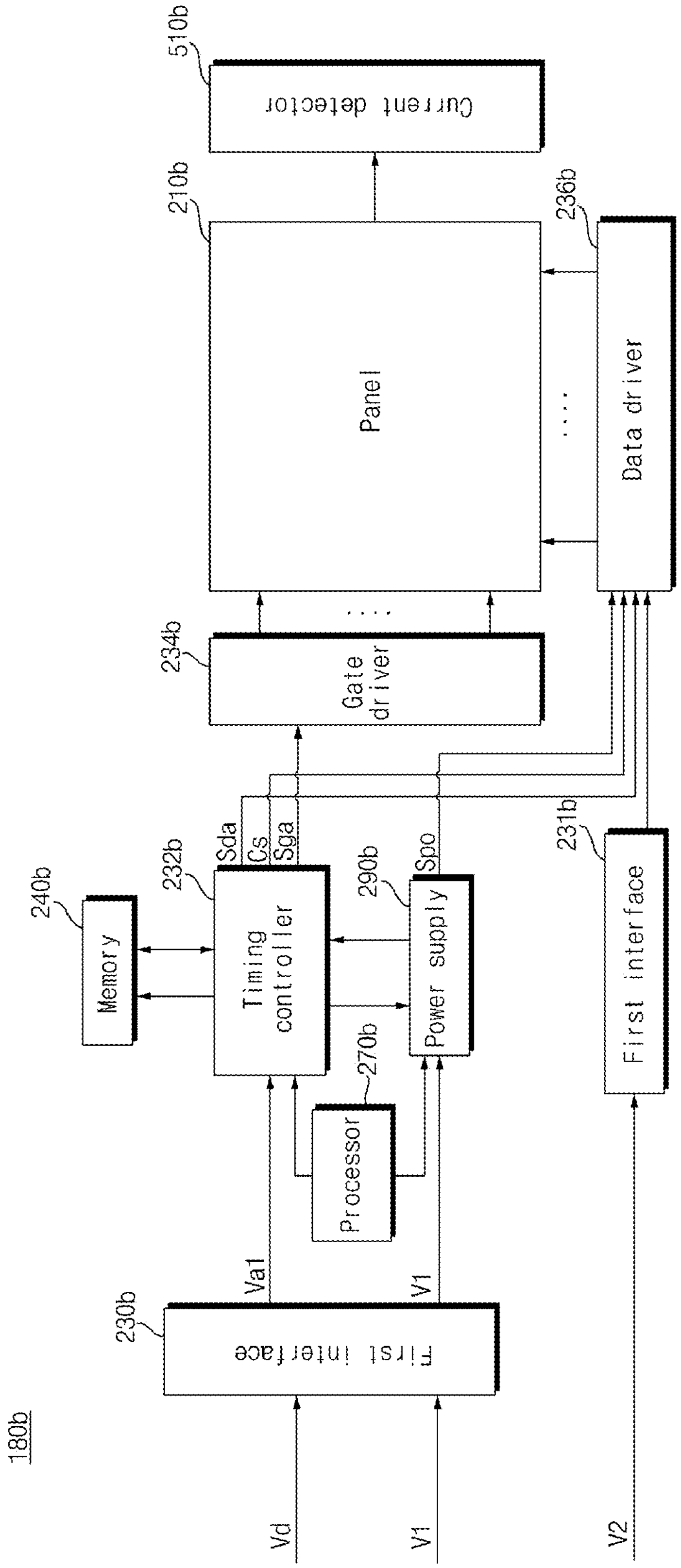
FIG. 5 is an exemplary internal block diagram of a display of FIG. 2.

FIG. 5 is an exemplary internal block diagram of a display of FIG. 2.

Referring to the figure, an organic light-emitting panel-based display 180 may include an organic light-emitting panel 210, a first interface 230, a second interface 231, a timing controller 232, a gate driver 234, a data driver 236, a memory 240, a processor 270, a power supply 290, a current detector 510.

The display 180 receives an image signal Vd, a first DC voltage V1, and a second DC voltage V2, and may display a predetermined image based on the image signal Vd.

Meanwhile, the first interface 230 in the display 180 may receive the image signal Vd and the first DC voltage V1 from the signal processing device 170.

Here, the first DC voltage V1 may be used for the operation of the power supply 290 and the timing controller 232 in the display 180.

Next, the second interface 231 may receive a second DC voltage V2 from an external power supply 190. Meanwhile, the second DC voltage V2 may be input to the data driver 236 in the display 180.

The timing controller 232 may output a data driving signal Sda and a gate driving signal Sga based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like in addition to the video signal Vd from the signal processing device 170.

In addition to the video signal Vd, based on a control signal, a vertical synchronization signal Vsync, and the like, the timing controller 232 may output a gate driving signal Sga for the operation of the gate driver 234 and a data driving signal Sda for the operation of the data driver 236.

At this time, when the panel 210*b* includes a RGBW subpixel, the data driving signal Sda may be a data driving signal for driving RGBW subpixels.

Meanwhile, the timing controller 232 may further output a control signal Cs to the gate driver 234.

The gate driver 234 and the data driver 236 supply a scan signal and an image signal to the organic light-emitting panel 210 through a gate line GL and a data line DL, respectively, according to the gate driving signal Sga and the data driving signal Sda from the timing controller 232. Accordingly, the organic light-emitting panel 210 displays a predetermined image.

Meanwhile, the organic light-emitting panel 210 may include an organic light-emitting layer. To display an image, a plurality of gate lines GL and data lines DL may be disposed in a matrix form in each pixel corresponding to the organic light-emitting layer.

Meanwhile, the data driver 236 may output a data signal to the organic light-emitting panel 210 based on a second DC voltage V2 from the second interface 231.

The power supply 290 may supply various levels of power to the gate driver 234, the data driver 236, the timing controller 232, and the like.

The current detector 510 may detect the current flowing into sub-pixels of the organic light-emitting panel 210. The detected current may be input to the processor 270 or the like, for a cumulative current calculation.

The processor 270 may perform various types of control within the display 180*b*. For example, the processor 270 may control the gate driver 234, the data driver 236, the timing controller 232, and the like.

Meanwhile, the processor 270 may receive information on the current flowing into the sub-pixels of the organic light-emitting panel 210 from the current detector 510.

The processor 270 may calculate the cumulative current of the sub-pixels of each organic light-emitting panel 210 based on the information on the current flowing into the sub-pixels of the organic light-emitting panel 210. The calculated cumulative current may be stored to the memory 240.

Meanwhile, when the cumulative current of the sub-pixels of each organic light-emitting panel 210 exceeds a threshold, the processor 270 may determine that the sub-pixels are in the burn-in state.

For example, if the cumulative current of a sub-pixel of each organic light-emitting panel 210 is larger than or equal to 300000 A, the processor 270 may determine that the sub-pixel is a burned-in sub-pixel.

Meanwhile, when the cumulative current of part of sub-pixels of each organic light-emitting panel 210 approaches a threshold, the processor 270 may determine that the corresponding sub-pixels are expected to be burned-in.

Meanwhile, based on the current detected by the current detector 510, the processor 270 may determine the sub-pixel exhibiting the largest cumulative current as a sub-pixel expecting burn-in.

Figure 6:
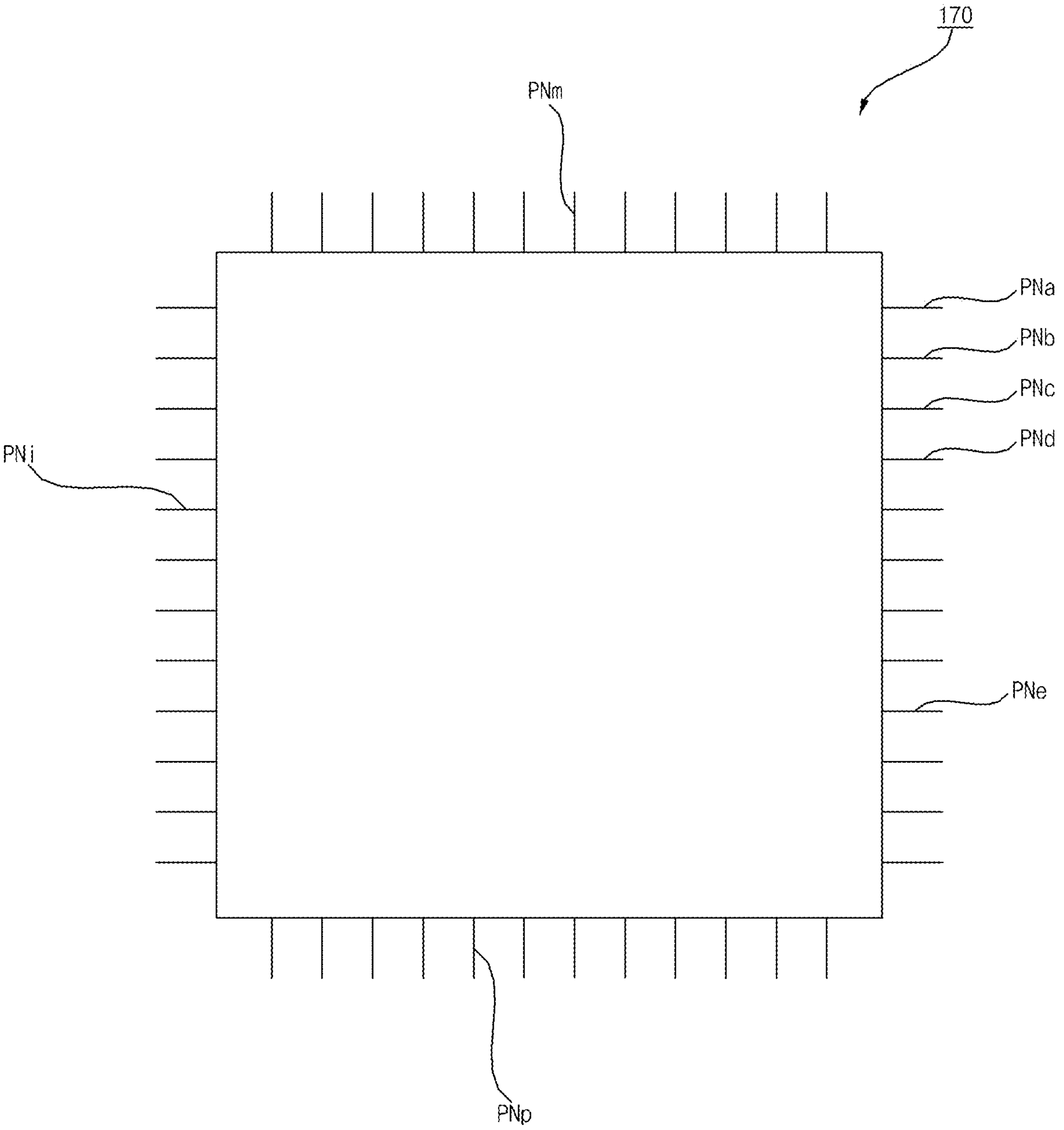
FIG. 6 is a diagram showing the appearance of a signal processing device according to an embodiment of the present disclosure.

FIG. 6 is a diagram showing the appearance of a signal processing device according to an embodiment of the present disclosure.

Referring to the figure, the signal processing device 170 in the form of SOC may include a plurality of output ports and a plurality of input ports for signal transmission or reception.

Meanwhile, the signal processing device 170 according to an embodiment of the present disclosure may include a plurality of output ports PNa-PNd for transmitting a signal to the timing controller 232.

Meanwhile, the signal processing device 170 according to an embodiment of the present disclosure may include an output port PNm for data communication with the memory 140.

Meanwhile, the signal processing device 170 according to an embodiment of the present disclosure may include an output port PNp for data communication with the power supply 190.

Meanwhile, the signal processing device 170 according to an embodiment of the present disclosure may include an output port PNe for data communication with the audio output device 185.

Meanwhile, the signal processing device 170 according to an embodiment of the present disclosure may include an input port PNi for data communication with the image receiver 105.

At this time, the input port PNi may be an input port for data communication with the tuner 110, an input port for data communication with the network interface 135 of FIG. 2, or an input port for data communication with the external apparatus interface 130 of FIG. 2.

Meanwhile, a plurality of output ports or a plurality of input ports shown in FIG. 6 may perform a plurality of communication modes.

For example, the plurality of output ports or the plurality of input ports shown in FIG. 6 may perform a first communication mode or a second communication mode.

At this time, the first communication mode may be General Purpose Input Output (GPIO) mode, and the second communication mode may be Inter Integrated Circuit (I2C) mode.

In another example, the plurality of output ports or the plurality of input ports shown in FIG. 6 may perform the first communication mode, second communication mode, or third communication mode.

At this time, the first communication mode may be General Purpose Input Output (GPIO) mode, the second communication mode may be Inter Integrated Circuit (I2C) mode, and the third communication mode may be Serial Peripheral Interface (SPI) mode.

Meanwhile, the present disclosure proposes a method for stably performing data communication when a plurality of output ports or a plurality of input ports perform a plurality of communication modes between modules within the image display apparatus 100. The method will be described with reference to FIG. 12 and subsequent drawings.

Figure 7:
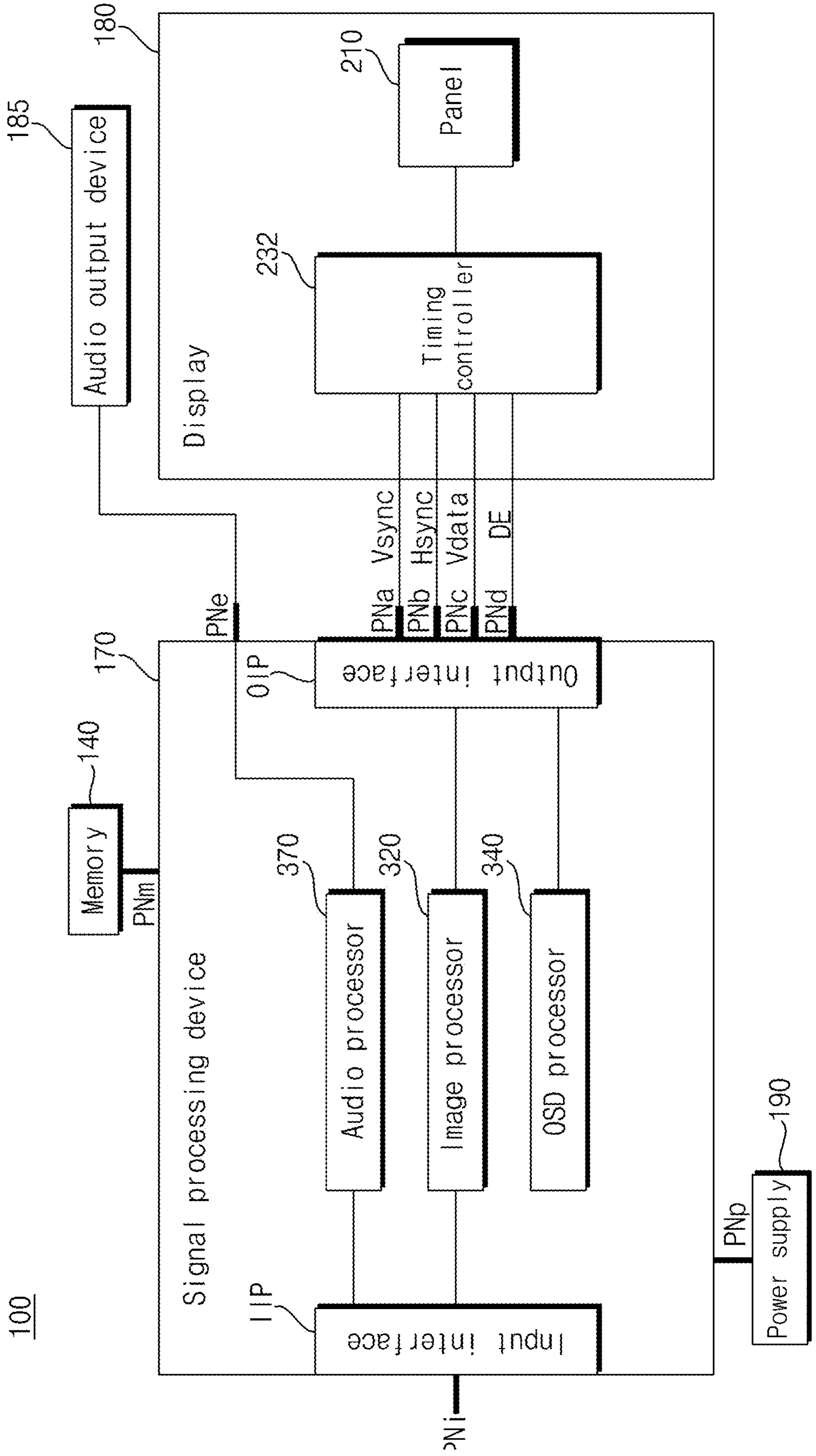
FIG. 7 is a detailed block diagram of an image display apparatus according to an embodiment of the present disclosure.

FIG. 7 is a detailed block diagram of an image display apparatus according to an embodiment of the present disclosure.

Referring to the figure, the image display apparatus 100 according to an embodiment of the present disclosure includes a signal processing device 170, a memory 140, an audio output device 185, a display 180, and a power supply 190.

The signal processing device 170 according to an embodiment of the present disclosure may include an input interface IIP receiving an image signal or an audio signal from the outside, an image processor 320 processing the image signal, an audio processor 370 processing the audio signal, an OSD processor 340 processing an OSD signal, and an output interface OIP outputting the processed image signal or audio signal or OSD signal.

Meanwhile, the display 180 may include a timing controller 232 and a panel 210.

Meanwhile, the output interface (OIP) may include an output port PNa for transmitting a vertical synchronization signal Vsync to the timing controller 232, an output port PNb for transmitting a horizontal synchronization signal Hsync to the timing controller 232, and output port PNc for for transmitting an image data signal Vdata to the timing controller 232, and an output port PNd for transmitting a data enable signal DE to the timing controller 232.

Meanwhile, the data enable signal DE may consist of an active period (not shown) and a blank period (not shown).

The timing controller 232 may receive an image data signal Vdata output from the output port PNc in response to the active period (not shown) of the data enable signal DE.

The signal processing device 170 according to an embodiment of the present disclosure may include an output port PNm for data communication with the memory 140, an output port PNp for data communication with the power supply 190, an output port PNe for data communication with the audio output device 185, and an input port PNi for data communication with the image receiver 105.

Figure 8:
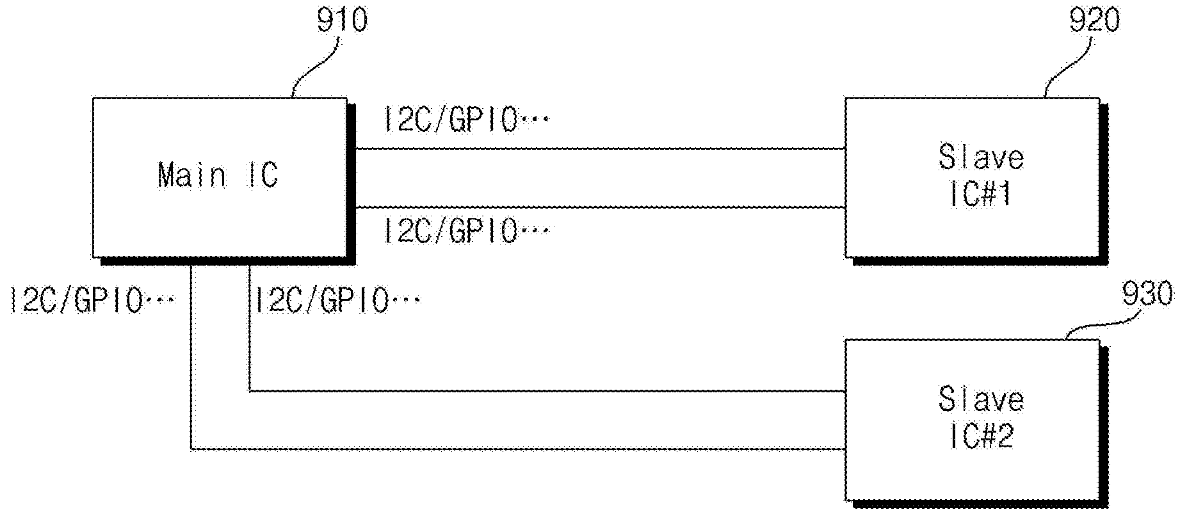
FIGS. 8 to 9*b* are diagrams referred to in the description of FIG. 7.
Figure 9A:
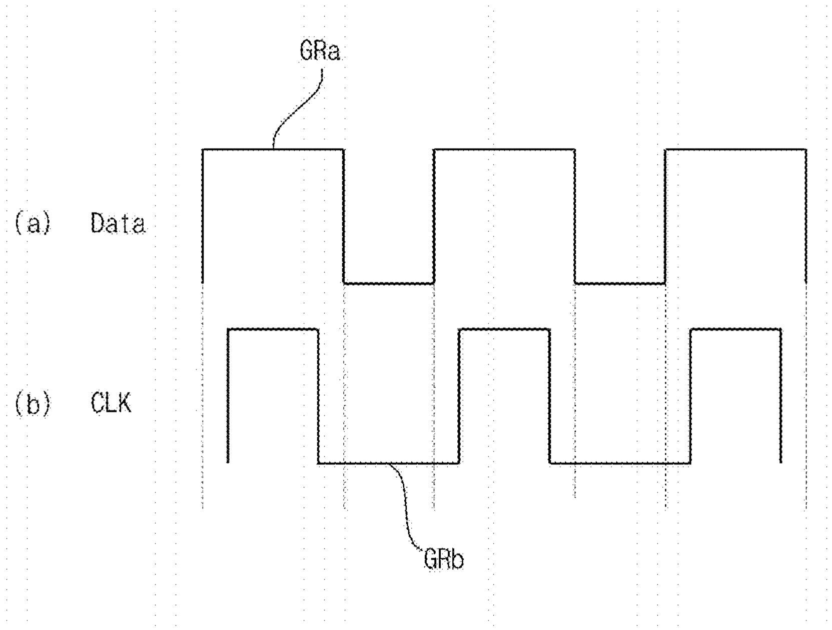
Figure 9B:
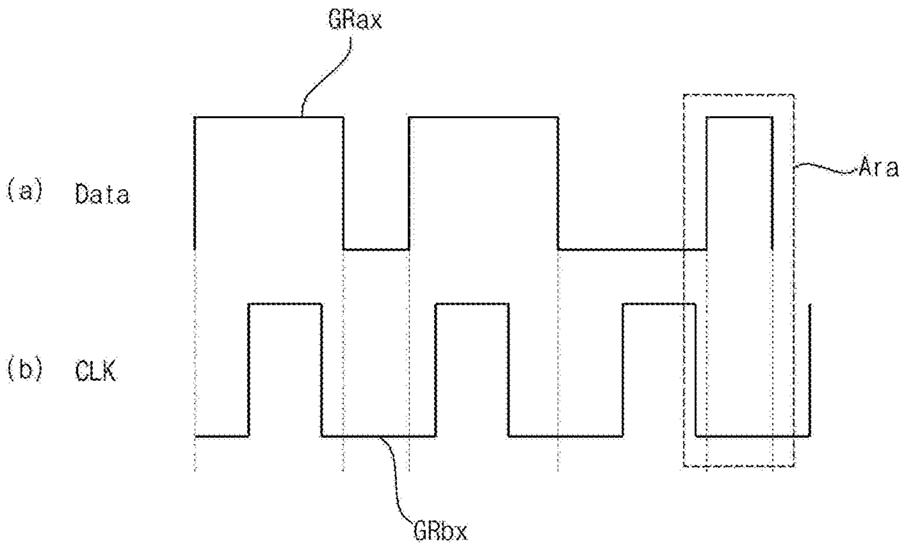

FIGS. 8 to 9*b* are drawings referred to in the description of FIG. 7.

FIG. 8 illustrates an arrangement of a plurality of modules within the image display apparatus.

Referring to the figure, the image display apparatus 100 may include a main IC module 910 and a plurality of slave IC modules 920, 930.

Data communication may be performed between the main IC module 910 and the plurality of slave IC modules 920, 930 based on a plurality of communication modes.

For example, data communication may be performed between the main IC module 910 and the plurality of slave IC modules 920, 930 based on the GPIO mode or I2C mode.

In another example, data communication may be performed between the main IC module 910 and the plurality of slave IC modules 920, 930 based on the GPIO mode, I2C mode, or SPI mode.

Meanwhile, the main IC module 910 in the figure may be the signal processing device 170, and the plurality of slave IC modules 920, 930 may be the memory 140, power supply 190, or audio output device 185, respectively.

FIGS. 9*a* and 9*b* illustrates I2C communication between individual modules.

First, FIG. 9*a* illustrates a case of normal operation when I2C communication is performed between individual modules.

Referring to the figure, in the case of normal operation when I2C communication is performed between individual modules, the high-level section of a data signal GRa is longer than the high-level section of a clock signal GRb, and the high-level section of the clock signal GRb is preferably included within the high-level section of the data signal GRa.

Next, FIG. 9*b* shows a case of abnormal operation when I2C communication is performed between individual modules.

Referring to the figure, in the case of abnormal operation when I2C communication is performed between individual modules, as in the Ara area, the high-level section of the clock signal GRb is not included within the high-level section of the data signal GRa, but the high-level section of the clock signal GRb is included within the low-level section of the data signal GRa.

In this case, data loss may occur due to an I2C communication error between the individual modules.

Figure 10:
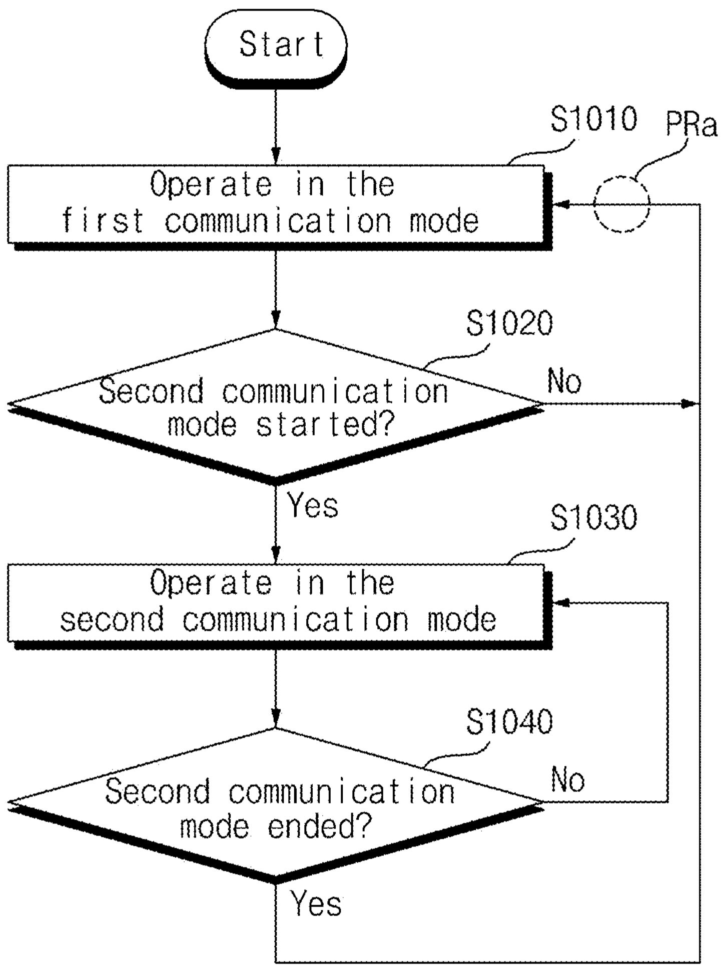
FIG. 10 is a flow diagram illustrating a method for operating an image display apparatus related to the present disclosure.
Figure 11A:
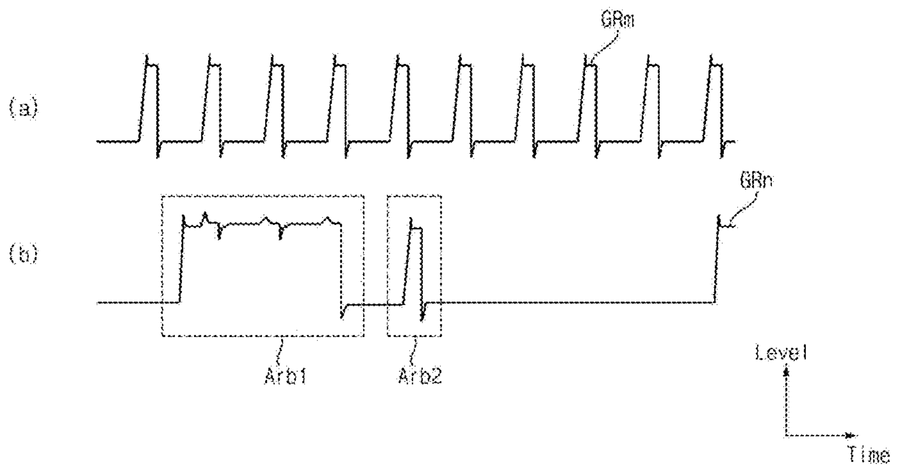
FIGS. 11*a* to 11*b* are diagrams referred to in the description of FIG. 10.
Figure 11B:
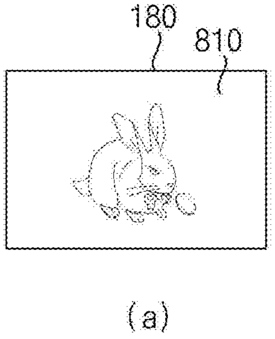
Figure 11B:
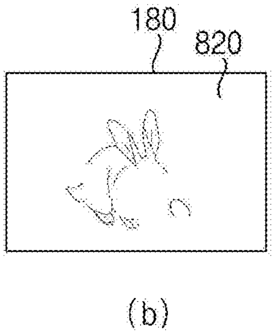

FIG. 10 is a flow diagram illustrating a method for operating an image display apparatus related to the present disclosure, and FIGS. 12*a* to 11*b* are diagrams referred to in the description of FIG. 10.

Referring to FIG. 10, a module within the image display apparatus 100 according to the present disclosure, for example, the signal processing device 170 operates in the first communication mode S1010.

At this time, the first communication mode may be GPIO mode by default.

Next, a module within the image display apparatus 100, for example, the signal processing device 170 may assess the start of the second communication mode S1020 and, if started, operates in the second communication mode S1030.

At this time, the second communication mode may be I2C mode.

Meanwhile, the start of the second communication mode may be determined based on whether a predetermined period has elapsed after the first communication mode is performed, change of transmission data, or a mode change input.

Next, a module within the image display apparatus 100, for example, the signal processing device 170 determines whether the second communication mode has ended S1040 and, if ended, operates in the first communication mode S1010.

For example, when the second communication mode is terminated, the first communication mode, which is the default mode, may be performed.

However, if switching from the second communication mode to the first communication mode occurs frequently, the possibility of a communication error increases as indicated by PRa in the figure.

FIG. 11*a* illustrates a communication error occurring when the communication mode is changed to GPIO mode after I2C mode is terminated.

Referring to the figure, (a) of FIG. 11*a* represents the clock signal GRm, and (b) of FIG. 11*b* represents the data signal GRn.

The data signal GRn may include a first area Arb1 corresponding to the second communication mode and a second area Arb2 corresponding to the first communication mode.

The figure shows a case in which the first area Arb1 of the data signal GRn includes a plurality of high-level sections of the clock signal, but the second area Arb2 of the data signal GRn does not include a high-level section of the clock signal.

Accordingly, the second communication mode is stably performed between modules, but a communication error occurs in the first communication mode.

Accordingly, in the section in which the second communication mode is stably performed, a first image 810 is stably displayed on the display 180, as shown in (a) of FIG. 11*b*; however, in the section in which a communication error occurs in the first communication mode, a second image 820 is displayed on the display 180 in an unstable manner, as shown in (b) of FIG. 11*b*.

To solve the problem, the present disclosure proposes a method for stably performing data communication between modules capable of performing a plurality of communication modes. The method will be described with reference to FIG. 12 and subsequent drawings.

Figure 12:
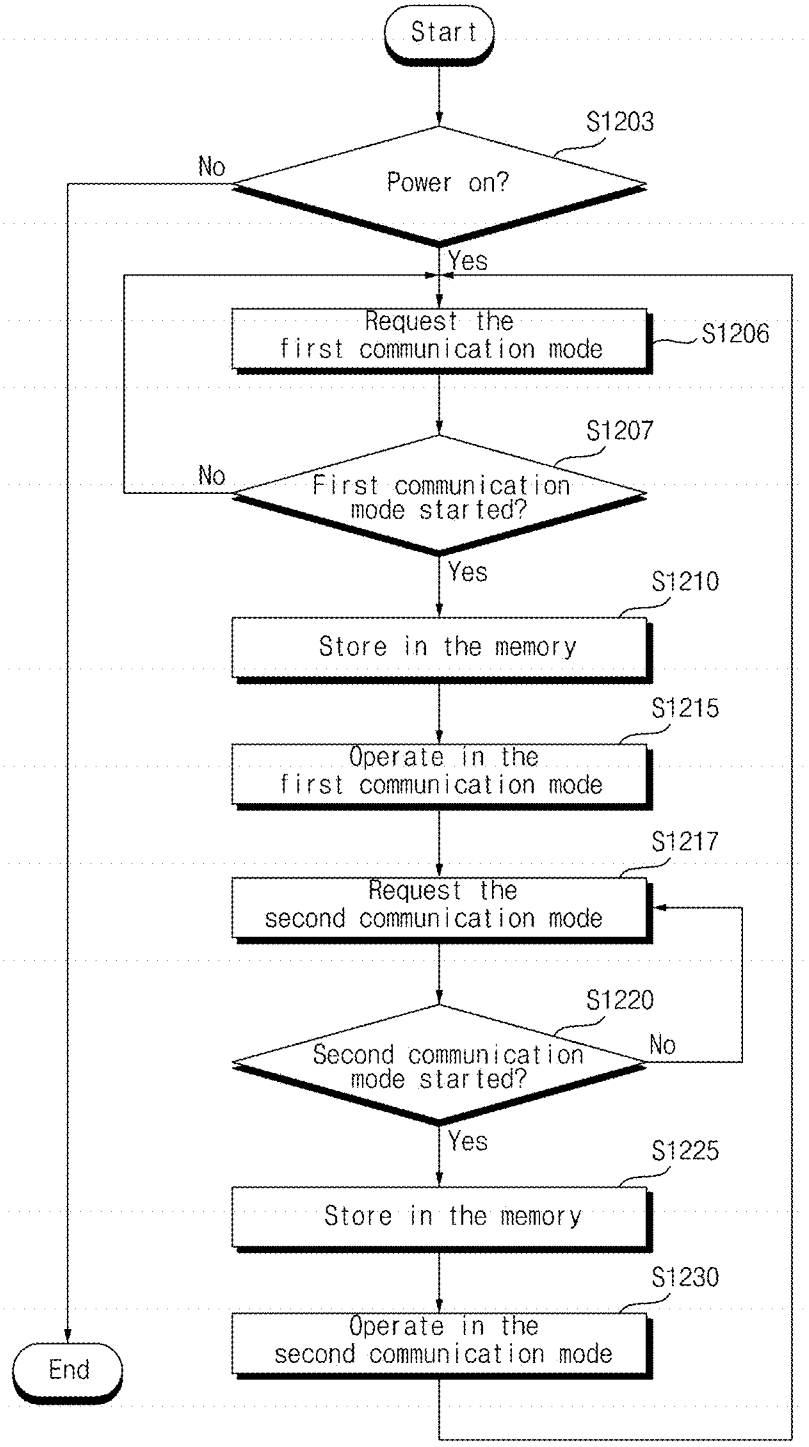
FIG. 12 is a flow diagram illustrating a method for operating an image display apparatus according to one embodiment of the present disclosure.

FIG. 12 is a flow diagram illustrating a method for operating an image display apparatus according to one embodiment of the present disclosure.

Referring to the figure, a first module within the image display apparatus 100 according to one embodiment of the present disclosure determines whether power is turned on S1203.

At this time, the first module may the signal processing device 170, power supply 190, memory 140, audio output device 185, or tuner 110. In what follows, it is assumed that the first module is the signal processing device 170.

For example, when a DC voltage is supplied from the power supply 190, the signal processing device 170 within the image display apparatus 100 may determine that power is turned on.

Meanwhile, is case in which power is turned on, the signal processing device 170 within the image display apparatus 100 may receive a request of the first communication mode for data communication with other modules S1206.

At this time, the request of the first communication mode may be received automatically or by default is case in which power is turned on.

Meanwhile, the signal processing device 170 within the image display apparatus 100 may determine, based on the request of the first communication mode, whether the first communication mode is stared S1207 and, if started, control the first communication mode to be stored to the memory 140 S1210.

Then, the signal processing device 170 within the image display apparatus 100 operates in the first communication mode when performing data communication with other modules S1215.

Next, the signal processing device 170 within the image display apparatus 100 receives a request of the second communication mode S1217.

At this time, the request of the second communication mode may be received when the first communication mode is completed, when a separate switching input is received, or when a predetermined time has elapsed after the first communication mode is performed.

Meanwhile, based on the request of the second communication mode, the signal processing device 170 within the image display apparatus 100 may be configured to determine whether the second communication mode is started S1220 and, if started, store the second communication mode to the memory 140 S1225.

Then, the signal processing device 170 within the image display apparatus 100 operates in the second communication mode when performing data communication with other modules S1230.

Afterwards, when the request of the first communication mode is received, and the first communication mode is started, the signal processing device 170 within the image display apparatus 100 may control the first communication mode to be stored again in the memory 140 and operate in the first communication mode when performing data communication with other modules.

At least one of a plurality of output ports or a plurality of input ports of the first module within the image display apparatus 100 of FIG. 10 according to one embodiment of the present disclosure operates based on the first communication mode or second communication mode; and the first module is configured to store the communication mode of the output port or input port PNi in operation to the memory 140 while operating in the first communication mode or second communication mode.

Specifically, at least one of a plurality of output ports or a plurality of input ports of the signal processing device 170 within the image display apparatus 100 according to one embodiment of the present disclosure operates based on the first communication mode or second communication mode; and the signal processing device 170 is configured to store the communication mode of the output port or input port PNi in operation to the memory 140 while operating in the first communication mode or second communication mode. Accordingly, a plurality of data communications may be stably performed between modules.

Meanwhile, in case in which a request of the first communication mode is received after power is on, the signal processing device 170 may be configured to start the first communication mode and store the first communication mode the memory.

As described above, by storing the first communication mode in the memory 140 immediately after the first communication mode is started, the possibility of a data communication error at the time of switching the communication mode may be reduced.

Meanwhile, after storing the first communication mode to the memory 140, in case in which a request of the second communication mode is received while operating in the first communication mode, the signal processing device 170 may be configured to start the second communication mode and store the second communication mode to the memory 140.

As described above, by storing the second communication mode in the memory 140 immediately after the second communication mode is started, the possibility of a data communication error at the time of switching the communication mode may be reduced.

Meanwhile, after storing the second communication mode to the memory 140, in case in which a request of the first communication mode is received while operating in the second communication mode, the signal processing device 170 may be configured to start the first communication mode and store the first communication mode the memory.

As described above, by storing the first communication mode in the memory 140 immediately after the first communication mode is started, the possibility of a data communication error at the time of switching the communication mode may be reduced.

Meanwhile, in case in which a request of the second communication mode is received, the signal processing device 170 may be configured to start the second communication mode and store the second communication mode to the memory 140.

Meanwhile, after power is on, the signal processing device 170 may control to operate in the second communication mode based on the request of the second communication mode.

In particular, different from FIG. 10, in case in which a request of the second communication mode is received after power is on, the signal processing device 170 may be configured to start the second communication mode and store the second communication mode to the memory 140. Accordingly, a plurality of data communications between modules may be stably performed between modules.

Meanwhile, different from FIG. 10, after power is on, in case in which a request of the first communication mode is received while operating in the second communication mode after storing the second communication mode in the memory 140 based on the request of the second communication mode, the signal processing device 170 may be configured to start the first communication mode and store the first communication mode the memory 140. Accordingly, a plurality of data communications between modules may be stably performed.

Meanwhile, while operating in the first communication mode or second communication mode, the signal processing device 170 may be configured to store the communication mode in operation to the memory 140.

Accordingly, when the signal processing device 170 is restarted while operating in the first communication mode or second communication mode, a plurality of data communications may be immediately and stably performed between modules based on a final communication mode stored to the memory 140.

Meanwhile, based on the communication mode in operation stored to the memory 140, the signal processing device 170 may control the communication mode in operation to be maintained until a request of the first communication mode or second communication mode is received. Accordingly, a plurality of data communications between modules may be stably performed.

Meanwhile, after power is on, the signal processing device 170 may control to operate based on a final communication mode stored to the memory 140 until a request of the first communication mode or second communication mode is received. Accordingly, a plurality of data communications between modules may be performed stably.

Meanwhile, as described with reference to FIG. 10, the first communication mode may be General Purpose Input Output (GPIO) mode, and the second communication mode may be Inter Integrated Circuit (I2C) mode.

Meanwhile, different from FIG. 10, each module within the image display apparatus 100 may perform the first communication mode, second communication mode, or third communication mode.

At this time, the first communication mode may be GPIO mode, the second communication mode may be I2C mode, and the third communication mode may be SPI mode.

Meanwhile, while operating in the second communication mode, namely, I2C mode, as shown in FIG. 9*a*, the signal processing device 170 may control the high-level section of a data signal to be longer than the high-level section of a clock signal and the high-level section of the clock signal to be included in the high-level section of the data signal. Accordingly, a plurality of data communications between modules may be performed stably.

Meanwhile, a first output port PNm among a plurality of output ports of the signal processing device 170 may transmit data or a control signal to the memory 140 based on the first communication mode or second communication mode, and the signal processing device 170 may control the communication mode of the first output port PNm in operation to be stored to the memory 140 while operating in the first communication mode or second communication mode.

Accordingly, data communication between the signal processing device 170 and the memory 140 may be performed stably. In particular, communication defects may be reduced when data communication is performed between the signal processing device 170 and the memory 140.

Meanwhile, a second output port PNe among a plurality of output ports of the signal processing device 170 may transmit an audio signal to the audio output device 185 based on the first communication mode or second communication mode, and the signal processing device 170 may be configured to store the communication mode of the second output port PNe in operation to the memory 140 while operating in the first or second communication mode.

Accordingly, data communication between the signal processing device 170 and the audio output device 185 may be performed stably. In particular, communication defects may be reduced when data communication is performed between the signal processing device 170 and the audio output device 185.

Meanwhile, a third output port PNp among a plurality of output ports of the signal processing device 170 may transmit a control signal to the power supply 190 based on the first communication mode or second communication mode, and the signal processing device 170 may be configured to store the communication mode of the third output port PNp in operation to the memory 140 while operating in the first or second communication mode.

Accordingly, data communication between the signal processing device 170 and the power supply 190 may be performed stably. In particular, communication defects may be reduced when data communication is performed between the signal processing device 170 and the power supply 190.

Meanwhile, a fourth output port PNc among a plurality of output ports of the signal processing device 170 may transmit an image signal to the timing controller 232 within the display 180 based on the first communication mode or second communication mode, and the signal processing device 170 may be configured to store the communication mode of the fourth output port PNc in operation to the memory while operating in the first or second communication mode.

Accordingly, data communication between the signal processing device 170 and the timing controller 232 may be performed stably. In particular, communication defects may be reduced when data communication is performed between the signal processing device 170 and the timing controller 232.

Meanwhile, an input port PNi of the signal processing device 170 receives a broadcast signal from the tuner 110 based on the first communication mode or second communication mode, and the signal processing device 170 may be configured to store the communication mode of the input port PNi in operation to the memory 140 while operating in the first or second communication mode.

Accordingly, data communication between the signal processing device 170 and the tuner 110 may be performed stably. In particular, communication defects may be reduced when data communication is performed between the signal processing device 170 and the tuner 110.

Meanwhile, the memory 140 may store a communication mode in operation between the signal processing device 170 and the display 180, a communication mode in operation between the signal processing device 170 and the audio output device 185, or a communication mode in operation between the signal processing device 170 and the memory 140. Accordingly, a plurality of data communications between modules may be performed stably.

Meanwhile, any one output port PNc among a plurality of output ports of the signal processing device 170 within the image display apparatus 100 according to another embodiment of the present disclosure transmits an image signal to the timing controller 232 based on the first communication mode or second communication mode, and the signal processing device 170 is configured to store a communication mode in operation to the memory 140 while operating in the first communication mode or second communication mode.

Accordingly, a plurality of data communications between modules may be performed stably. In particular, communication defects may be reduced when data communication is performed between modules. Furthermore, an image signal output from the signal processing device 170 may be stably transmitted to the timing controller 232.

Figure 13:
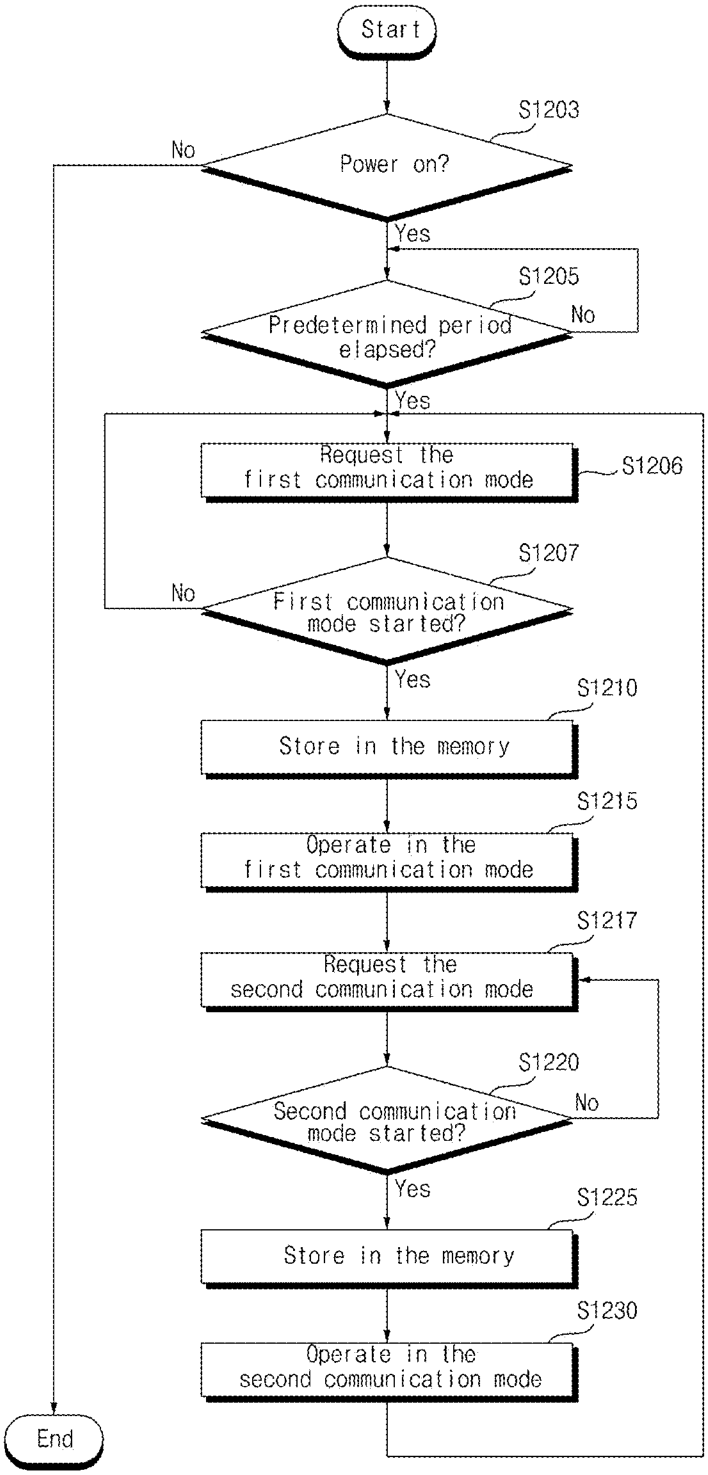
FIG. 13 is a flow diagram illustrating a method for operating an image display apparatus according to another embodiment of the present disclosure.

FIG. 13 is a flow diagram illustrating a method for operating an image display apparatus according to another embodiment of the present disclosure.

The method for operating an image display apparatus according to another embodiment of the present disclosure of FIG. 13 is similar to the method for operating an image display apparatus of FIG. 12, with a difference that the S1205 step is further performed.

Referring to the figure, the image processing device 170 according to another embodiment of the present disclosure may determine whether power is turned on S1203 and, if turned on, determines whether a predetermined period has elapsed S1205.

At this time, the predetermined period may correspond to the initialization period of the signal processing device 170.

Meanwhile, is case in which power is on, after a predetermined period has elapsed, the signal processing device 170 may receive a request of the first communication mode S1206.

Then, is case in which power is on, and the first communication mode is started after a request of the first communication mode is received while a predetermined period is passed, the signal processing device 170 may store the first communication mode in the memory 140 and operate in the first communication mode S1215.

Accordingly, a plurality of data communications between modules may be stably performed.

Alternatively, is case in which power is on, the signal processing device 170 may control to operate in the first communication mode after a predetermined period has elapsed. Accordingly, a plurality of data communications between modules may be stably performed.

Figure 14:
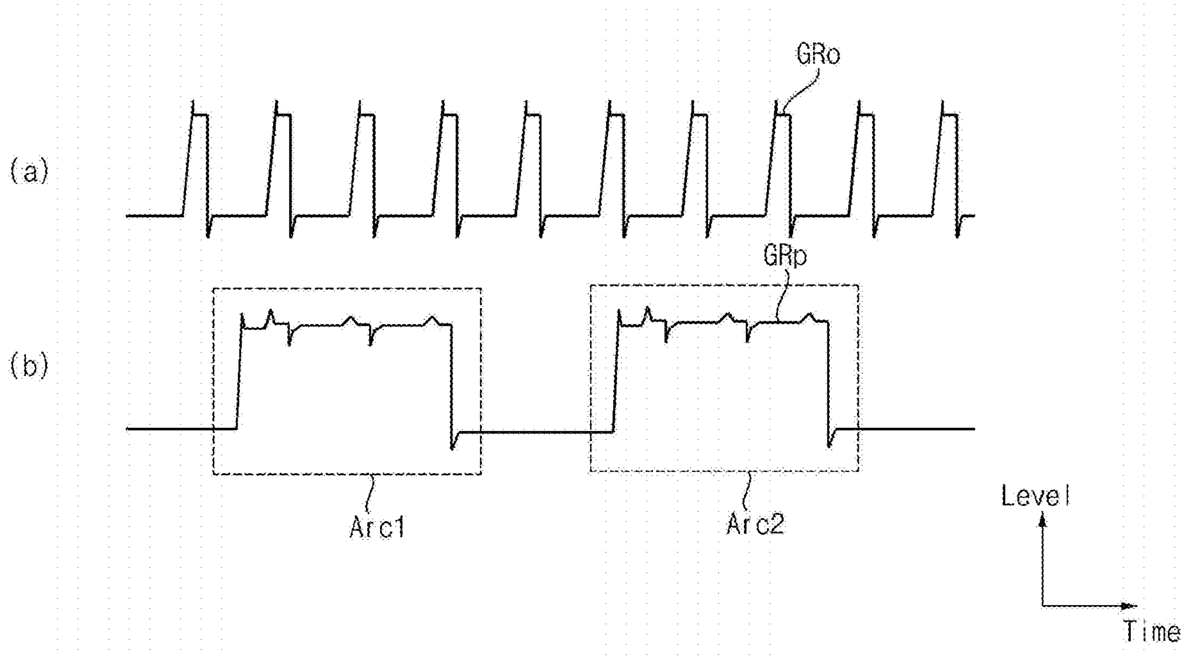
FIG. 14 is a diagram referred to in description of FIG. 12 or FIG. 13.

FIG. 14 is a diagram referred to in description of FIG. 12 or FIG. 13.

In particular, FIG. 14 illustrates a data signal when it is switched to GPIO mode after I2C mode is terminated.

Referring to the figure, (a) of FIG. 14 represents the clock signal GRo, and (b) of FIG. 14 represents the data signal GRp.

The data signal GRp may include a first area ARc1 corresponding to the second communication mode and a second area ARc2 corresponding to the first communication mode.

The figure shows a case in which the first area ARc1 of the data signal GRp includes a plurality of high-level sections of the clock signal, and the second area Arc2 of the data signal GRp also includes a high-level section of the clock signal.

Accordingly, the second communication mode is stably performed between modules, and the first communication mode is also stably performed between modules. In other words, a communication error does not occur.

Accordingly, in the section in which the second communication mode is stably performed, a first image 810 is stably displayed on the display 180, as shown in (a) of FIG. 11*b*; also, in the section in which the first communication mode is stably performed, the first image 810 is stably displayed on the display 180, as shown in (b) of FIG. 11*b*.

As described above, an image display apparatus according to one embodiment of the present disclosure comprises a memory, a display, an audio output device, and a signal processing device configured to output an image signal to the display, wherein at least one of a plurality of output ports or a plurality of input ports of the signal processing device operates based on a first communication mode or a second communication mode, and the signal processing device is configured to store a communication mode of an output port or an input port in operation to the memory while operating in the first communication mode or second communication mode. Accordingly, a plurality of data communications between modules may be performed stably. In particular, communication defects may be reduced when data communication is performed between modules.

Meanwhile, in case in which a request of the first communication mode is received after power is on, the signal processing device may be configured to start the first communication mode and store the first communication mode the memory. Accordingly, a plurality of data communications between modules may be performed stably.

Meanwhile, after storing the first communication mode to the memory, in case in which a request of the second communication mode is received while operating in the first communication mode, the signal processing device may be configured to start the second communication mode and store the second communication mode to the memory. Accordingly, a plurality of data communications between modules may be performed stably.

Meanwhile, after storing the second communication mode to the memory, in case in which a request of the first communication mode is received while operating in the second communication mode, the signal processing device may control the first communication mode to be stored to the memory. Accordingly, a plurality of data communications between modules may be performed stably.

Meanwhile, in case in which a request of the second communication mode is received, the signal processing device may be configured to start the second communication mode and store the second communication mode to the memory. Accordingly, a plurality of data communications between modules may be performed stably.

Meanwhile, after the second communication mode is stored, in case in which a request of the first communication mode is received while operating in the second communication mode, the signal processing device may be configured to start the first communication mode and store the first communication mode the memory. Accordingly, a plurality of data communications between modules may be performed stably.

Meanwhile, after power is on, the signal processing device may control to operate in the first communication mode based on the request of the first communication mode. Accordingly, a plurality of data communications between modules may be performed stably.

Meanwhile, is case in which power is on, and a setup period is passed, the signal processing device may control to operate in the first communication mode. Accordingly, a plurality of data communications between modules may be performed stably.

Meanwhile, after power is on, the signal processing device may control to operate in the second communication mode based on the request of the second communication mode. Accordingly, a plurality of data communications between modules may be performed stably.

Meanwhile, while operating in the first communication mode or second communication mode, the signal processing device may be configured to store the communication mode in operation to the memory. Accordingly, a plurality of data communications between modules may be performed stably.

Meanwhile, based on the communication mode in operation stored to the memory, the signal processing device may control to maintain the communication mode in operation until a request of the first communication mode or second communication mode is received. Accordingly, a plurality of data communications between modules may be performed stably.

Meanwhile, after power is on, the signal processing device may control to operate based on a final communication mode stored to the memory until a request of the first communication mode or second communication mode is received. Accordingly, a plurality of data communications between modules may be performed stably.

Meanwhile, the first communication mode may be General Purpose Input Output (GPIO) mode, and the second communication mode may be Inter Integrated Circuit (I2C) mode. Accordingly, a plurality of data communications between modules may be performed stably.

Meanwhile, while operating in the second communication mode, the signal processing device may control the high-level section of a data signal to be longer than the high-level section of a clock signal and the high-level section of the clock signal to be included in the high-level section of the data signal. Accordingly, a plurality of data communications between modules may be performed stably.

Meanwhile, a first output port among a plurality of output ports of the signal processing device may transmit data or a control signal to the memory based on the first communication mode or second communication mode, and the signal processing device may be configured to store the communication mode of the first output port in operation to the memory while operating in the first communication mode or second communication mode. Accordingly, a plurality of data communications between modules may be performed stably. In particular, communication defects may be reduced when data communication is performed between modules.

Meanwhile, an image processing apparatus according to one embodiment of the present disclosure may further comprise an audio output device, a second output port among a plurality of output ports of the signal processing device may transmit an audio signal to the audio output device based on the first communication mode or second communication mode, and the signal processing device may be configured to store the communication mode of the second output port in operation to the memory while operating in the first or second communication mode. Accordingly, a plurality of data communications between modules may be performed stably. In particular, communication defects may be reduced when data communication is performed between modules.

An image display apparatus according to one embodiment of the present disclosure may further comprise a power supply, a third output port among a plurality of output ports of the signal processing device may transmit a control signal to the power supply based on the first communication mode or second communication mode, and the signal processing device may be configured to store the communication mode of the third output port in operation to the memory while operating in the first or second communication mode. Accordingly, a plurality of data communications between modules may be performed stably. In particular, communication defects may be reduced when data communication is performed between modules.

Meanwhile, a fourth output port among a plurality of output ports of the signal processing device may transmit an image signal to a timing controller within the display based on the first communication mode or second communication mode, and the signal processing device may be configured to store the communication mode of the fourth output port in operation to the memory while operating in the first or second communication mode. Accordingly, a plurality of data communications between modules may be performed stably. In particular, communication defects may be reduced when data communication is performed between modules.

An image display apparatus according to one embodiment of the present disclosure may further comprise a tuner to receive a broadcast signal, an input port of the signal processing device receives a broadcast signal from the tuner based on the first communication mode or second communication mode, and the signal processing device may be configured to store the communication mode of the input port in operation to the memory while operating in the first or second communication mode. Accordingly, a plurality of data communications between modules may be performed stably. In particular, communication defects may be reduced when data communication is performed between modules.

Meanwhile, the memory may store a communication mode in operation between the signal processing device and the display, a communication mode in operation between the signal processing device and the audio output device, or a communication mode in operation between the signal processing device and the memory. Accordingly, a plurality of data communications between modules may be performed stably. In particular, communication defects may be reduced when data communication is performed between modules.

An image display apparatus according to another embodiment of the present disclosure may comprise a memory, a display including a timing controller and a panel, and a signal processing device configured to output an image signal to the display, wherein a first output port among a plurality of output ports of the signal processing device transmits an image signal to the timing controller based on the first communication mode or second communication mode, and the signal processing device is configured to store a communication mode in operation to the memory while operating in the first communication mode or second communication mode. Accordingly, a plurality of data communications between modules may be performed stably. In particular, communication defects may be reduced when data communication is performed between modules.

While the disclosure has been described with reference to the embodiments, the disclosure is not limited to the above-described specific embodiments, and it will be understood by those skilled in the related art that various modifications and variations may be made without departing from the scope of the disclosure as defined by the appended claims, as well as these modifications and variations should not be understood separately from the technical spirit and prospect of the disclosure.

What is claimed is:

1. An image display apparatus comprising:

a memory;

a display;

an audio output device; and a signal processing device configured to output an image signal to the display, wherein at least one of a plurality of output ports or a plurality of input ports of the signal processing device operates based on a first communication mode or a second communication mode, wherein the signal processing device is configured to store a communication mode of an output port or an input port in operation to the memory while operating in the first communication mode or second communication mode, wherein the first communication mode corresponds to General Purpose Input Output (GPIO) mode, and the second communication mode corresponds to Inter Integrated Circuit (I2C) mode, and wherein, while operating in the second communication mode, the signal processing device controls a high-level section of a data signal to be longer than a high-level section of a clock signal and the high-level section of the clock signal to be included in the high-level section of the data signal.

2. The image display apparatus of claim 1, wherein, in case in which a request of the first communication mode is received after power is on, the signal processing device is configured to start the first communication mode and store the first communication mode to the memory.

3. The image display apparatus of claim 2, wherein, after storing the first communication mode to the memory, in case in which a request of the second communication mode is received while operating in the first communication mode, the signal processing device is configured to start the second communication mode and store the second communication mode to the memory.

4. The image display apparatus of claim 3, wherein, after storing the second communication mode to the memory, in case in which a request of the first communication mode is received while operating in the second communication mode, the signal processing device is configured to start the first communication mode and store the first communication mode to the memory.

5. The image display apparatus of claim 1, wherein, in case in which a request of the second communication mode is received, the signal processing device is configured to start the second communication mode and store the second communication mode to the memory.

6. The image display apparatus of claim 5, wherein, after the second communication mode is stored, in case in which a request of the first communication mode is received while operating in the second communication mode, the signal processing device is configured to start the first communication mode and store the first communication mode to the memory.

7. The image display apparatus of claim 1, wherein, after power is on, the signal processing device is configured to operate in the first communication mode based on a request of the first communication mode.

8. The image display apparatus of claim 1, wherein, in case in which power is on, and a predetermined period is passed, the signal processing device is configured to operate in the first communication mode.

9. The image display apparatus of claim 1, wherein, after power is on, the signal processing device is configured to operate in the second communication mode based on a request of the second communication mode.

10. The image display apparatus of claim 1, wherein, while operating in the first communication mode or second communication mode, the signal processing device is configured to store the communication mode in operation to the memory.

11. The image display apparatus of claim 1, wherein, based on the communication mode in operation stored to the memory, the signal processing device is configured to maintain the communication mode in operation until a request of the first communication mode or second communication mode is received.

12. The image display apparatus of claim 1, wherein, after power is on, the signal processing device is configured to operate based on a final communication mode stored to the memory until a request of the first communication mode or second communication mode is received.

13. The image display apparatus of claim 1, wherein a first output port among a plurality of output ports of the signal processing device transmits data or a control signal to the memory based on the first communication mode or second communication mode, and wherein the signal processing device is configured to store the communication mode of the first output port in operation to the memory while operating in the first communication mode or second communication mode.

14. The image display apparatus of claim 1, further comprising an audio output device, wherein a second output port among a plurality of output ports of the signal processing device transmits an audio signal to the audio output device based on the first communication mode or second communication mode, and wherein the signal processing device is configured to store the communication mode of the second output port in operation to the memory while operating in the first or second communication mode.

15. The image display apparatus of claim 1, wherein a fourth output port among a plurality of output ports of the signal processing device transmits the image signal to a timing controller within the display based on the first communication mode or second communication mode, and wherein the signal processing device is configured to store the communication mode of the fourth output port in operation to the memory while operating in the first or second communication mode.

16. An image display apparatus comprising:

a memory;

a display:

a power supply:

an audio output device; and a signal processing device configured to output an image signal to the display, wherein at least one of a plurality of output ports or a plurality of input ports of the signal processing device operates based on a first communication mode or a second communication mode, wherein the signal processing device is configured to store a communication mode of an output port or an input port in operation to the memory while operating in the first communication mode or second communication mode, wherein a first output port among a plurality of output ports of the signal processing device transmits a control signal to the power supply based on the first communication mode or second communication mode, and wherein the signal processing device is configured to store the communication mode of the first output port in operation to the memory while operating in the first or second communication mode.

17. An image display apparatus comprising:

a memory;

a display;

a tuner to receive a broadcast signal;

an audio output device; and a signal processing device configured to output an image signal to the display, wherein at least one of a plurality of output ports or a plurality of input ports of the signal processing device operates based on a first communication mode or a second communication mode, wherein the signal processing device is configured to store a communication mode of an output port or an input port in operation to the memory while operating in the first communication mode or second communication mode, wherein an input port of the signal processing device receives the broadcast signal from the tuner based on the first communication mode or second communication mode, and wherein the signal processing device is configured to store the communication mode of the input port in operation to the memory while operating in the first or second communication mode.

18. An image display apparatus comprising:

a memory;

a display including a timing controller and a panel; and a signal processing device configured to output an image signal to the display, wherein a first output port among a plurality of output ports of the signal processing device transmits the image signal to the timing controller based on a first communication mode or a second communication mode, wherein the signal processing device is configured to store a communication mode in operation to the memory while operating in the first communication mode or second communication mode, wherein the first communication mode corresponds to General Purpose Input Output (GPIO) mode, and the second communication mode corresponds to Inter Integrated Circuit (I2C) mode, and wherein, while operating in the second communication mode, the signal processing device controls a high-level section of a data signal to be longer than a high-level section of a clock signal and the high-level section of the clock signal to be included in the high-level section of the data signal.

* * * * *